(12) United States Patent
Inoguchi et al.

(10) Patent No.: US 8,366,279 B2
(45) Date of Patent: Feb. 5, 2013

(54) IMAGE DISPLAY APPARATUS

(75) Inventors: Kazutaka Inoguchi, Kawasaki (JP);
Masakazu Tohara, Kawasaki (JP);
Shoichi Yamazaki, Yokohama (JP);
Kenichi Saito, Yokohama (JP); Motomi Tsuyuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 12/333,538

(22) Filed: Dec. 12, 2008

(65) Prior Publication Data
US 2009/0153960 A1 Jun. 18, 2009

(30) Foreign Application Priority Data
Dec. 14, 2007 (JP) .................. 2007-322713

(51) Int. Cl.
G03B 21/28 (2006.01)

(52) U.S. Cl. ............... 353/99; 353/28; 353/30; 353/94; 353/76; 353/77; 359/618; 345/7; 345/9

(58) Field of Classification Search ............ 353/28, 353/30, 94, 77, 76, 31, 98, 99, 119; 359/631, 359/633, 630, 632, 637, 237, 245; 348/36, 348/51, 52, 53, 54, 55, 56, 57, 58, 59; 345/7, 345/8, 9, 630, 13, 631, 36, 51–59
See application file for complete search history.

(56) References Cited

U.S. PATENT DOCUMENTS

| | | | |
|---|---|---|---|
| 4,757,378 A | 7/1988 | Hackett, Jr. et al. | |
| 5,734,505 A | 3/1998 | Togino et al. | |
| 5,754,344 A * | 5/1998 | Fujiyama | 359/631 |
| 5,982,343 A | 11/1999 | Iba et al. | |
| 6,008,778 A | 12/1999 | Takahashi et al. | |
| 6,046,857 A * | 4/2000 | Morishima | 359/630 |
| 6,464,361 B2 * | 10/2002 | Togino et al. | 353/98 |
| 6,585,378 B2 * | 7/2003 | Kurtz et al. | 353/31 |

(Continued)

FOREIGN PATENT DOCUMENTS

| | | |
|---|---|---|
| EP | 1424586 A2 | 6/2004 |
| JP | 07-274097 A | 10/1995 |
| JP | 07-333551 A | 12/1995 |
| JP | 9080353 A | 3/1997 |

(Continued)

OTHER PUBLICATIONS

OplusE., Jan. 1986, No. 74, pp. 123-126 (Japanese text with English translation).

(Continued)

*Primary Examiner* — Georgia Y Epps
*Assistant Examiner* — Sultan Chowdhury
(74) *Attorney, Agent, or Firm* — Canon U.S.A., Inc. IP Division

(57) ABSTRACT

An image display apparatus includes plural image forming devices and an observation optical system that includes at least a first optical system configured to fold in a first section a luminous flux from a first image forming device by using a plurality of reflective surfaces and to guide the luminous flux from the first image forming device to the exit pupil, and a second optical system configured to fold in a second section a luminous flux from a second image forming device by using a plurality of reflective surfaces and to guide the luminous flux from the second image forming device to the exit pupil, wherein the first section intersects the second section on an axis that directs from one point in the exit pupil to one point in the observation field.

10 Claims, 13 Drawing Sheets

U.S. PATENT DOCUMENTS

| | | | |
|---|---|---|---|
| 6,795,042 B1 * | 9/2004 | Nagata et al. | 345/8 |
| 6,955,436 B2 * | 10/2005 | Watanabe | 353/122 |
| 7,019,715 B1 * | 3/2006 | Kasai et al. | 345/8 |
| 7,055,959 B2 * | 6/2006 | Wada et al. | 353/77 |
| 7,090,356 B2 * | 8/2006 | Koide | 353/85 |
| 7,199,935 B2 * | 4/2007 | Inoguchi et al. | 359/633 |
| 7,262,919 B1 | 8/2007 | Yamazaki et al. | |
| 7,352,521 B2 * | 4/2008 | Matsunaga | 359/834 |
| 7,365,907 B2 * | 4/2008 | Ikeda et al. | 359/460 |
| 2002/0024636 A1 * | 2/2002 | Okamori et al. | 353/31 |
| 2004/0032571 A1 * | 2/2004 | Sunaga et al. | 353/77 |

FOREIGN PATENT DOCUMENTS

| | | |
|---|---|---|
| JP | 10-246865 A | 9/1998 |
| JP | 11-326820 A | 11/1999 |
| JP | 11326820 A | 11/1999 |
| JP | 2000258723 A | 9/2000 |
| JP | 2004007315 A | 1/2004 |

OTHER PUBLICATIONS

Extended European Search Report issued Jun. 18, 2010—4 pages.

* cited by examiner

IMAGE DISPLAY APPARATUS

BACKGROUND OF THE INVENTION

1. Field of the Invention

The present invention relates to an image display apparatus, such as a head mount display ("HMD"), which guides a plurality of luminous fluxes from a plurality of original images to different field areas in a single observation field, and displays a synthesis image.

2. Description of the Related Art

A small observation optical system is required for an image display apparatus, such as the HMD. In particular, a thin observation optical system is required in an observer's visual-axis direction. In addition, in order to enhance the realism of the image observations, the observation optical system is required to present an image having a wide angle of view.

The human field area is classified into a discrimination visual field (which is a region in which a sight function, such as an eyesight, is dominant or a region within several degrees from the center of an image), an effective filed (which is a region in which information can be searched only with eye movements or a region within horizontally ±15° and perpendicularly +8° to −12°), and an guide visual field (which is a region that affects a spatial coordinate system but provides only an identification capability that can identify an existence of the sense of sight and rough information of its identity or a region within horizontally ±50° and perpendicularly +350 to −50°).

According to O plus E, pp. 123-124, Physiological optics 16, January 1986, an angle of view suitable for the observation optical system is said to be an angle of view necessary to feel the realism of a wide screen image in the guide visual field. Hence, the field angle in the HMD can be a wide angle of view that covers a whole region of the guide visual field.

Nevertheless, it is difficult to constitute a small and lightweight observation optical system that covers the whole region of the guide visual field, and it is realistic to secure a field that is as close as possible to the angle of view of the guide visual field beyond the effective visual field.

Japanese Patent Laid-Open No. 07-333551 discloses an optical system suitable for a thin observation optical system. The optical system disclosed in Japanese Patent Laid-Open No. 07-333551 introduces a luminous flux from an optical image to a prism, folds an optical path on a plurality of decentering reflective and curved surfaces of the prism, and guides a luminous flux exited from the prism to a pupil. This optical system corrects a decentering aberration so that each surface can have a different optical power in accordance with an azimuth angle.

The optical system disclosed in Japanese Patent Laid-Open No. 07-333551 is small but introduces the luminous flux from the original image to the pupil without forming an intermediate image, and thus an achievable limit of the angle of view is small relative to a size of an original image displayed on an image forming device, such as a liquid crystal panel. Thus, use of a large image forming device having a wide original-image forming area is necessary to achieve a wide view angle.

When the image forming device is large, it is easy for an observation optical system to present an image having a wide angle of view. However, it is difficult to always obtain an image forming device having a proper size of an original-image forming area for a specification of a presented angle of view.

Japanese Patent Laid-Open Nos. 07-274097, 11-326820, and 10-246865 each disclose an observation optical system that can present an image with a wide angle of view while using an image forming device having an original-image forming area that is small relative to the angle-of-view specification. Each of these observation optical systems synthesizes a plurality of images formed by a plurality of luminous fluxes from the original image corresponding to different field areas, and presents the synthesized image in one observation field.

The observation optical system disclosed in Japanese Patent Laid-Open No. 07-274097 provides a V-shaped mirror to the interior of the optical system, reflects a luminous flux from one original image formed by one image forming device, on one mirror surface of the V-shaped mirror, and directs the luminous flux to the pupil. Japanese Patent Laid-Open No. 07-274097 also discloses an observation optical system that reflects the luminous flux from one original image, on one half-mirror in the V-shaped half-mirror, then reflects the luminous flux on the concave mirror, transmits the luminous flux thorough the one half-mirror in the V-shaped half-mirror, and directs the luminous flux to the pupil. This observation optical system folds the optical path of the luminous flux from the original image by using the other half-mirror surface in the V-shaped half-mirror and the concave mirror.

In Japanese Patent Laid-Open No. 07-274097, where a central angle-of-view principal ray is defined as a ray on an axis that connects the center of the pupil of the observation optical system to the center of the observation field on which the synthesis image is presented, the central angle-of-view principal ray passes an apex portion of the V-shaped half-mirror. Moreover, a section of an optical path of the central angle-of-view principal ray folded by the V-shaped half-mirror and the concave mirror is common to two original images.

In addition, the observation optical system disclosed in Japanese Patent Laid-Open No. 11-326820 uses a prism that integrates two prisms with each other, each of which is configured to introduce the luminous flux from one original image to the pupil, and the observation optical system presents two images formed by the luminous fluxes from the two original images in one observation field. These two optical systems, which correspond to two original images, and constitute the observation optical system, are configured so that sections that contain (folding) optical paths of the central angle-of-view principal ray folded by a plurality of decentering reflective and curved surfaces can accord with each other. In addition, these two optical systems corresponding to the two original images are configured to be arranged symmetrical with respect to a section that contains the central angle-of-view principal ray and is perpendicular to the sections that contain the folding optical path of the central angle-of-view principal ray.

Moreover, the optical paths from the two original images overlap each other in the observation optical system disclosed in Japanese Patent Laid-Open No. 10-246865, and an incident surface of the prism that opposes to the two image forming devices serves as a reflective surface that reflects the luminous flex from the other image forming device and directs it to the pupil. In other words, the optical surface included in each of the two optical systems corresponding to the two original images is commonly used for the luminous flexes from the two original images. The two optical systems are arranged symmetrical with respect to a section that contains the central angle-of-view principal ray, and is perpendicular to the section that contains the folding optical path of the central angle-of-view principal ray.

Thus, each of Japanese Patent Laid-Open Nos. 07-274097, 11-326820, and 10-246865 synthesizes, within one observation field, images formed by the luminous fluxes from the two original images by using the two optical systems that are arranged adjacently or in a partially overlapping state.

In order to reduce the size of the whole observation optical system (or a thickness in the visual-axis direction), it is effective that one optical system bears a small angle of view. On the other hand, when the angle of view which one optical system bears is small, an angle of view of a whole observation optical system cannot be made sufficiently wide.

The observation optical systems disclosed in Japanese Patent Laid-Open Nos. 07-274097, 11-326820, and 10-246865 use only two image forming devices and two optical systems, and thus one optical system bears a large angle of view. Thus, the thickness of the observation optical system becomes large, and it is difficult to make small and thin the image display apparatus.

In addition, the observation optical systems disclosed in Japanese Patent Laid-Open Nos. 07-274097, 11-326820, and 10-246865 arrange two optical systems adjacently, and thus the luminous flux from one image forming device is highly likely to reach the other image forming device. If the luminous flux from the one image forming device is reflected on the surface of the other image forming device, the reflected light may cause a ghost and/or a flare.

Moreover, the observation optical systems disclosed in Japanese Patent Laid-Open Nos. 07-274097, 11-326820, and 10-246865 use two image forming devices and two optical systems to make wide an angle of view in the horizontal direction.

The guide visual field has a higher ratio of a horizontal field to a perpendicular field than the effective visual field and the overall field sensible to the human. In the effective visual field, the horizontal field is wider than the perpendicular field. Hence, it is reasonable to maintain a wide field particularly in the horizontal direction. However, it is effective to realize a wide angle of view to some extent even in the perpendicular direction so as to improve the realism through a display that covers the whole guide visual field as thorough as possible.

In addition, since the observation optical systems disclosed in Japanese Patent Laid-Open Nos. 07-274097, 11-326820, and 10-246865 halves the field with the two optical systems, a seam exists at the field center between the two optical systems. Therefore, at the field center which an observer is highly likely to address, the quality of the presented image may degrade due to the discontinuity of the images, low brightness, flares that are generated from the unnecessary light that occurs at the seam.

SUMMARY OF THE INVENTION

The present invention is directed to a thin image display apparatus that uses an observation optical system that includes a plurality of image forming devices and a plurality of optical systems, and presents a high quality image having a wide angle of view.

An image display apparatus according to one aspect of the present invention includes a plurality of image forming devices, each of which is configured to form an original image, and an observation optical system configured to guide luminous fluxes from the plurality of image forming devices to a common exit pupil, and to present images that correspond to the plurality of original images and serve as images of different field areas in an observation field, wherein the observation optical system includes at least a first optical system configured to fold in a first section a luminous flux from a first image forming device by using a plurality of reflective surfaces and to guide the luminous flux from the first image forming device to the exit pupil, and a second optical system configured to fold in a second section a luminous flux from a second image forming device by using a plurality of reflective surfaces and to guide the luminous flux from the second image forming device to the exit pupil, and wherein the first section intersects the second section on an axis that directs from one point in the exit pupil to one point in the observation field.

Further features of the present invention will become apparent from the following description of exemplary embodiments with reference to the attached drawings.

DESCRIPTION OF THE EMBODIMENTS

Referring now to the accompanying drawings, a description will be given of the embodiments of the present invention.

Figure 1:
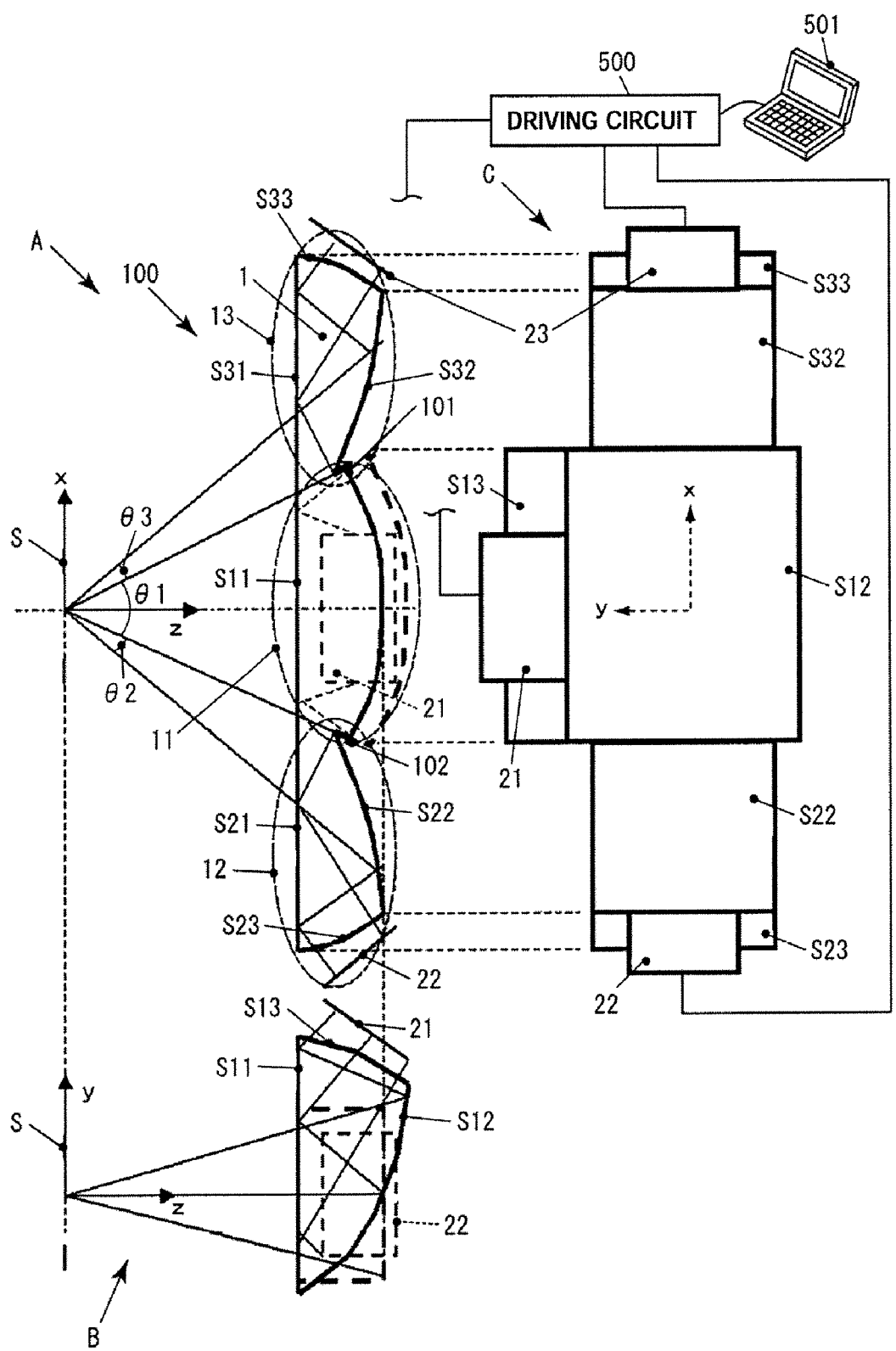
FIG. 1 shows a top sectional view, a side sectional view, and a rear view of an observation optical system in a HMD according to a first embodiment of the present invention.

FIG. 1 shows a structure of an observation optical system 100 of an HMD (image display apparatus) according to a first embodiment of the present invention.

When the HMD is attached to an observer's head, the observer who has placed his single eye (pupil) at a position of an exit pupil of the observation optical system 100 can observe an image well.

A section A (which is a xz section or a second section) in FIG. 1 is a section of the observation optical system 100 viewed from the top after the HMD is attached to the observer's head, and a section B (which is a yz section or a first section) is a section of the observation optical system 100 viewed from the side. A section C (which is a surface parallel to the xy section) is a section of the observation optical system 100 viewed from the back (or an opposite side to the exit pupil). Although FIG. 1 shows the observation optical system for a single eye, the actual HMD is provided with a pair of observation optical systems 100 for the right eye and for the left eyes.

11 denotes a first optical system, 12 denotes a second optical system, and 13 denotes a third optical system. 21 denotes a first image forming device that displays a first original image, 22 denotes a second image forming device that displays a second original image, and 23 denotes a third image forming device that displays a third original image.

Each of the first to third image forming devices 21 to 23 includes an optical modulation element, such as a liquid crystal panel and an organic EL. The first to third image forming devices 21 to 23 are connected to a driving circuit 500 that is provided in the HMD. The driving circuit 500 instructs the first to third image forming devices 21 to 23 to form first to third original images according to an image signal input from an image supply apparatus (such as a personal computer, a DVD player, a video recorder, and a TV tuner) 501. The HMD and the image supply apparatus 501 of this embodiment constitute an image display system. This is true of the following other embodiments.

Figure 2A:
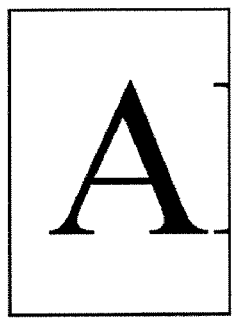
FIG. 2A is a view showing an illustrative second original image in the first embodiment.
Figure 2B:
FIG. 2B is a view showing an illustrative first original image in the first embodiment.
Figure 2C:
FIG. 2C is a view showing an illustrative third original image in the first embodiment.

FIG. 2A shows a second original image formed by a second image forming device 22. FIG. 2B shows a first original image formed by the first image forming device 21. FIG. 2C shows a third original image formed by the third image forming device 23.

Figure 2D:
FIG. 2D is a view showing an example of a synthesis image of the original images shown in FIGS. 2A to 2C.

The first to third optical systems 11 to 13 guide the luminous fluxes from the first to third image forming devices 21 to 23 to a common exit pupil S, and present images of different field areas (first to third field areas θ1 to θ3) to the observation field, which images correspond to the third to third original images. Thereby, the presented image is a synthesis image which connects or synthesizes the three images of the three different field areas (or angles of field) into one image having a wide angle of view as a whole, as shown in FIG. 2D.

In FIG. 1, the section A is a decentering section of the second and third optical systems 12 and 13. The section B is a decentering section of the first optical system 11. S denotes an exit pupil of the observation optical system 100. The decentering sections A and B intersect each other at a right angle on a z axis that is an axis directing from the center (one point) of the exit pupil S to the center (one point) of the observation field or the synthesis image. The x-axis direction denotes a horizontal direction of the observation field, and the y-axis direction denotes the perpendicular direction of the observation field.

The first optical system 11 has a surface S11 (which is a reflective surface as well as an exit transmission surface), a surface S12 (which is a reflective surface), and a surface S13 (which is an incident transmission surface). The second optical system 12 has a surface S21 (which is a reflective surface as well as an exit transmission surface), a surface S22 (which is a reflective surface), and a surface S23 (which is an incident transmission surface). The third optical system 13 has a surface S31 (which is a reflective surface as well as an exit transmission surface), a surface S32 (which is a reflective surface), and a surface S33 (which is an incident transmission surface).

The first to third optical systems 11 to 13 (or the observation optical system 100) are configured by forming the surfaces S11 to S33 on a single optical element 1 filled with a medium having a refractive index greater than 1. The optical element 1 may be an integrally molded element or a bonded and integrated member of three elements that constitute the first to third optical systems 11 to 13. This is true of the following other embodiments. In addition, the surfaces S11, S12, S21, S22, S31, and S32 are decentering reflective surfaces.

The luminous flux from the first original image formed by the first image forming device 21 is incident upon the optical element 1 via the surface S13 of the first optical system 11, is reflected on the reflective surface S11, is reflected on the reflective surface S12, transmits the surface S11, and is guided to the exit pupil S.

When at least one of the surfaces S11 to S13 have curved shapes or optical powers, an observer who has placed his eye (pupil) at the position of the exit pupil S can observe an enlarged virtual image of the first original image, in the first field area e1. In particular, the surface S12 that is used only for the reflective surface can be a concave mirror with a power enough to form an enlarged virtual image of the original image on the surface S12. This is because a reflection on the surface S12 is a reflection in the medium having a refractive index greater than 1, and the surface S12 can obtain a stronger power with a small curvature than a refractive surface, and can reduce a generation of the chromatic aberration.

In addition, the surface S12 may have a rotationally asymmetrical shape so as to restrain the rotationally asymmetrical aberration (decentering aberration) that is generated when the surface S12 has a curved surface. Thereby, an image can be well presented in which a deterioration of the image quality is restrained which would otherwise occur when the first optical system 11 includes a decentering optical system.

When all of the surfaces S11 to S13 have curved surfaces and take partial charge of the power to form the enlarged virtual image, a generation of the aberration of each surface can be restrained. In addition, when all of the surfaces S11 to S13 have rotationally asymmetrical shapes, a decentering aberration, which could not be restrained with the surface S12 that has a rotationally asymmetrical shape, can be corrected more effectively.

The effective luminous flux that forms the exit pupil S can enter the S11 at an angle larger than a critical angle at the time of the reflection on the surface S11, undergo an internally total reflection, and enter and transmit the surface S11 at an angle smaller than the critical angle at the time of the transmission through the S11. Thereby, a loss of the light quantity in the first optical system 11 can be made small, and a bright image can be presented.

Thus, the first optical system 11 folds an optical path of the luminous flux from the first original image (first image forming device 21) by using a plurality of reflective surfaces S11 and S12, thereby enabling the reflective surface S12 to obtain a strong power with a small curvature. Thereby, the first optical system 11 is a thin optical system in the visual-axis direction (z-axis direction).

The surfaces S11, S21, and S31 may be such continuous surfaces that no boundaries between the virtual images corresponding to the original images can be observed. For example, the surfaces S11, S21, and S31 can be expressed by one curved-surface equation having a set origin that defines the surface on the passage area of the effective luminous flux on the surface S11. Thereby, when the center of the observer's pupil shifts from the center of the exit pupil S of the observation optical system, a deterioration of the image quality can be reduced, such as an absence of a seam between images in the synthesis image, and a discontinuity or a deformation of the images of the three field areas.

The above effective or suitable structures are true of the second and third optical systems 12 and 13 of this embodiment and each optical system of the other embodiments.

The luminous flux from the second original image formed by the second image forming device 22 is incident upon the optical element 1 via the surface S23 of the second optical system 12, is reflected on the reflective surface S21, is reflected on the reflective surface S22, and then transmit the surface S21, and is guided to the exit pupil S. Due to the power of the optical surface in the optical path, the observer who has placed his pupil at the position of the exit pupil S can observe the enlarged virtual image of the second original image, in the second field area θ2.

The luminous flux from the third original image formed by the third image forming device 23 is incident upon the optical element 1 via the surface S33 of the third optical system 13, is reflected on the reflective surface S31, is reflected on the reflective surface S32, then transmits the surface S31, and is guided to the exit pupil S. Due to the power of the optical surface in the optical path, the observer who has placed his pupil at the position of the exit pupil S can observe the enlarged virtual image of the third original image, in the third field area θ3. The second and third optical systems 12 and 13 present images to the two field areas θ2 and θ3 that are opposite to each other with respect to the first field area θ1 to which the first optical system 11 presents the image.

Thus, when the luminous fluxes from the three original images are guided to the exit pupil S through corresponding optical systems, the observer can observe a synthesis image, which is made by synthesizing the enlarged virtual images of the original images into one, in the observation field that includes the first to third field areas θ1 to θ3. The first field area θ1 is a field area that extends in the horizontal direction with the z axis as a center, and wider than each of and a total of the second and third field areas θ2 and θ3.

In this embodiment, the second optical system 12 and the third optical system 13 are optical systems having the same decentering section (xz section) that is a folding section of the luminous flux (optical path). In other words, the decentering section is a section in which the decentering reflective surface reflects a ray that passes the center of the original image and the center of the exit pupil S of the observation optical system.

In this embodiment, as described above, the decentering section B of the first optical system 11 intersects the decentering section A of the second and third optical systems 12 and 13 at a right angle on the z axis that directs from the center of the exit pupil S to the center of the observation field (which will be referred to as a "synthesis field" hereinafter).

The second and third optical systems 12 and 13 having the same decentering section A are arranged opposite to each other with respect to the first optical system 11 having the decentering section B orthogonal to the decentering section A.

In order for the luminous flux from one of the second and third image forming devices 22 and 23 to reach the other image forming device, the luminous flux needs to pass the boundary between the second optical system 12 and the first optical system 11, and the boundary between the first optical system 11 and the third optical system 13. Therefore, a quantity of the luminous flux that reaches the other image forming device from the one image forming device becomes smaller than the conventional observation optical system that adjacently arranges two optical systems having the same decentering section.

The second and third optical systems 12 and 13 sandwich the first optical system 11 having a different decentering section. Therefore, the luminous flux that proceeds on the decentering section A from one of the second and third image forming devices 22 and 23 is reflected on the surface of the first optical system 11, becomes the luminous flux that proceeds on the decentering section different from the decentering section A, and proceeds off the other image forming device.

Due to these two operations, a quantity of the luminous flux from one of the image forming devices corresponding to the second and third optical systems 12 and 13 having the same decentering section A, to the other image forming device can be reduced. As a result, a generation of the unnecessary light, such as a ghost and a flare, can be restrained.

As shown in the section A in FIG. 1, steps 101 and 102 are formed at the boundaries between the first optical system 11 and the second optical system 12 and between the first optical system 11 and the third optical system 13. Side surfaces of the steps 101 and 102 may have shapes that extend to the center of the exit pupil S of the observation optical system. Thereby, the image can be synthesized without an absence of an image and a decrease of the brightness at the seam of the original image.

A light-shielding film can be formed at the steps 101 and 102, edge portions of the boundary between the first optical system 11 and the second optical system 12, and the boundary between the first optical system 11 and third optical system 13, so as to restrain a generation of the unnecessary light, such as edge diffusions and stray light.

If the optical element 1 is produced by joining three elements having the same shape or size each of which constitutes the first to third optical systems, it is difficult to form the surfaces S11, S21, and S31 into a continuous surface that prevents boundaries between the virtual images corresponding to the three original images from being observed. The element of the first optical system 11 and the two elements that constitute the second and third optical systems 12 and 13 may be made different in shape, and joined together to produce the optical element 1.

For this purpose, the first image forming device 21 and the second and third image forming devices 22 and 23 may use different (effective) sizes of the effective forming areas of the original image. More specifically, each of the effective sizes of the second and third image forming devices 22 and 23 can be made smaller than that of the first image forming device 21.

Thereby, it is easy to form the surfaces S11, S21, and S31 into a continuous surface that can prevent the boundaries between the virtual images corresponding to the three original images from being observed. In addition, for the second and third image forming devices 22 and 23, a proper effective size can be selected among all angles of view in the HMD according to an angle-of-view portion other than an angle-of-view portion corresponding to the first image forming device 21. Therefore, the HMD that includes the three image forming devices 21 to 23 and the three optical systems 11 to 13 can be made smaller.

Figure 3A:
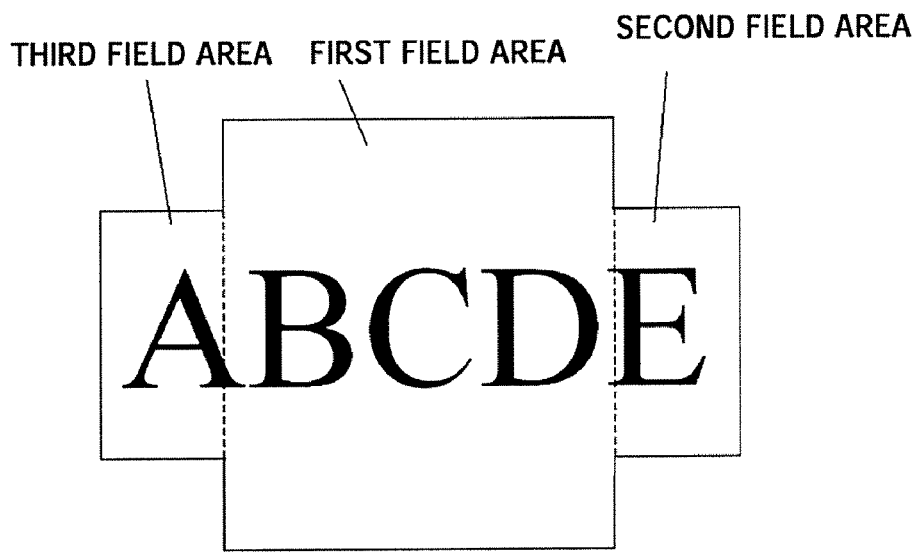
FIG. 3A is a view showing another illustrative synthesis image in the first embodiment.
Figure 3B:
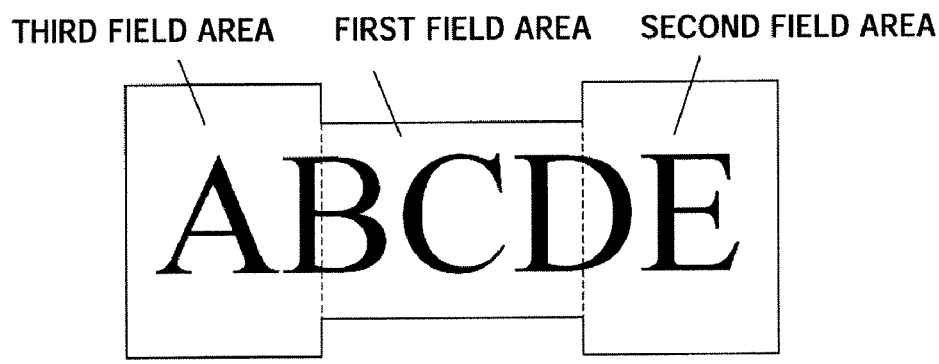
FIG. 3B is a view showing another illustrative synthesis image in the first embodiment.
Figure 3C:
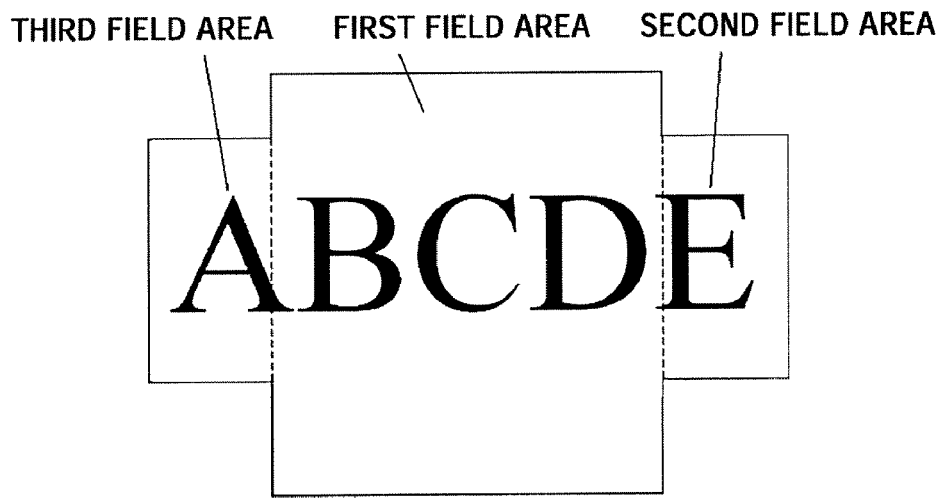
FIG. 3C is a view showing another illustrative synthesis image in the first embodiment.

In addition, the first to third field areas which the first optical system 21 and the second and third optical systems 22 and 23 formed by the first optical system 21 and the second and third optical systems 22 and 23 are not limited to those shown in FIGS. 2A to 2C. FIGS. 3A to 3C show other illustrative first to third field areas. The first field area θ1 is a field area that extends in the horizontal direction with the z axis as a center, and is wider than each of the second and third field areas θ2 and θ3, similar to the example shown in FIGS. 2A to 2C.

FIG. 3A is an example in which a perpendicular angle of view of the first field area is larger than that of each of the second and third field areas. In this case, when the first field area is 30° or greater in the horizontal direction and 20° or greater in the perpendicular direction and the observer pays attention to the center of the synthesis field (synthesis image), the boundaries between the first field area and the second field area and between the first field area and the third field area are removed from the observer's effective visual field. Therefore, even if a discontinuity of the image and a decrease of brightness occur at seams between images that constitute the synthesis image, an image included in the effective visual field or its surrounding field in which the information can be immediately recognized is not affected in the usual observation state in which the center of the synthesis image is often noticed. Therefore, the observation optical system can be built in which a degradation of the image quality is less likely to be recognized.

FIG. 3B is an example in which the perpendicular angle of view of the first field area is smaller than that of each of the second and third field areas. In this case, the boundaries between the first field area and the second field area and between the first field area and the third field area may enter the observer's effective visual field, but the optical system can be made thin.

FIG. 3A shows an example in which the centers of the second and third field areas in the perpendicular direction are as high as the center of the first field area in the perpendicular direction. However, as shown in FIG. 3C, the centers of the second and third field areas in the perpendicular direction may be shifted from the center of the first field area in the perpendicular direction. This example is effective to improve the realism because differences between the synthesis field and the guide visual field uniformly change laterally and longitudinally when the first field area is sufficiently wider than the observer's effective visual field and the synthesis field runs short relative to the guide visual field. In this case, the line (axis) formed by an intersection between the decentering section of the first optical system 11 the decentering section of the second and third optical systems 12 and 13 is an axis parallel to the z axis that directs from the center of the exit pupil S to the center of the synthesis field. In other words, similar to the z axis that directs from the center of the exit pupil S to the center of the synthesis field, it is an axis that directs from one point in the exit pupil to one point in the synthesis field (observation field).

The above variation of the field area can be realized by changing a shape and an effective size of the image forming device, and a specification of the optical system including its shape, size, and focal length between the first optical system and the second and third optical systems which have different decentering sections.

Figure 4A:
FIG. 4A is a view showing an illustrative second original image in the first embodiment.
Figure 4B:
FIG. 4B is a view showing an illustrative first original image in the first embodiment.
Figure 4C:
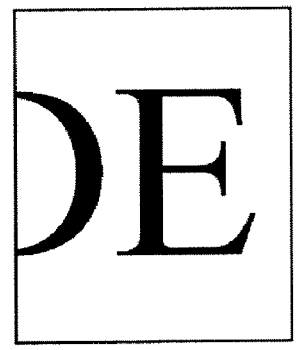
FIG. 4C is a view showing an illustrative third original image in the first embodiment.
Figure 4D:
FIG. 4D is a view showing an illustrative synthesis image of the original images shown in FIGS. 4A to 4C.

Moreover, in FIGS. 2A to 2C and 3A to 3C, a description has been given of formations of the first to third field areas without any overlaps between them. However, as shown in FIGS. 4A to 4C, the first to third field areas may be overlapped. In this case, as illustrated in FIGS. 4A to 4C, the first to third original images are formed to include overlapping portions. FIG. 4D shows a synthesis image in this case. This example can prevent a recognition of an absence of a seam between the images that constitute the synthesis image, when the observer's pupil shifts from the exit pupil S of the observation optical system.

This embodiment synthesizes three (odd number) images into one image by using the three (odd number) optical systems 11 to 13 on the decentering section A of the second and third optical systems 12 and 13 that are arranged at both sides of the first optical system 11 having the decentering section B. In this case, the three optical systems 11 to 13 may be configured such that they can maintain a surface symmetry relationship with respect to the decentering section B of the first optical system 11. In other words, as described above, when the first field area is defined as a field area around the z axis in the horizontal direction, the second and third field areas may be formed with the same angle of view at both sides of the first field area. This is because the effective visual field and the guide visual field are laterally symmetrical fields in the horizontal direction, and a structure that prevents a seam of the images that constitute the synthesis image from entering the discrimination visual field (if possible effective visual field) is facilitated.

The observation optical system 100 of this embodiment folds in the decentering section the optical paths of the luminous fluxes from the three original images in the decentering sections by using the three decentering optical systems 11 to 13, synthesizes the three images corresponding to the three original images, and enables one synthesis image to be observed. Therefore, an angle of view which the whole observation optical system can present is sufficiently wide relative to the thickness of each optical system.

Second Embodiment

Figure 5:
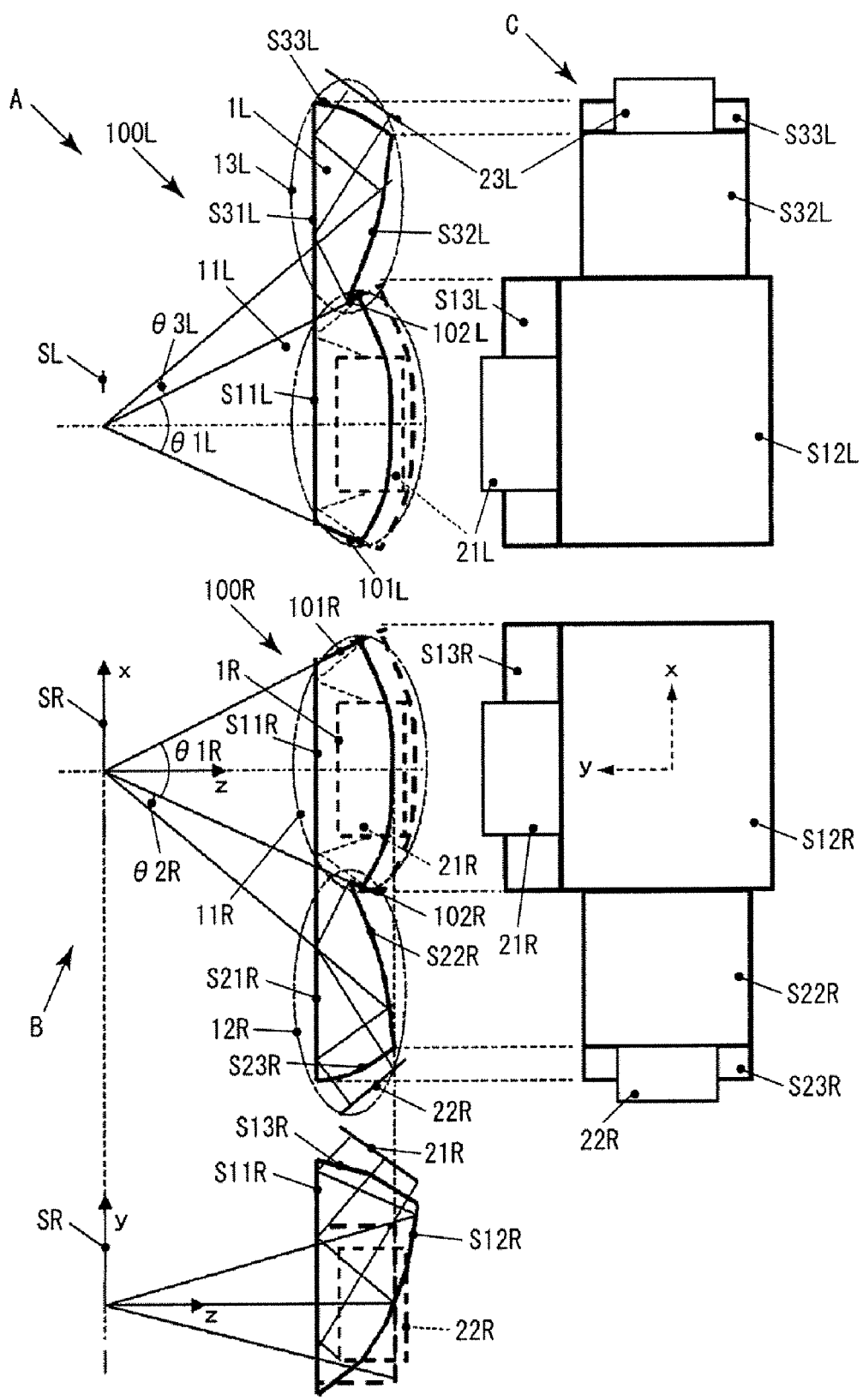
FIG. 5 is a top sectional view, a side sectional view, and a rear view of an observation optical system in a HMD according to a second embodiment of the present invention.

FIG. 5 shows structures of the observation optical systems 100L and 100R in an HMD according to a second embodiment of the present invention.

When the HMD is attached to the observer's head and the observer places his both eyes (pupils) at the exit pupils of the observation optical systems 100L and 100R, he can observe an image well.

A section A (xz section or a second section) in FIG. 5 is a section of the observation optical systems 100L and 100R viewed from the top after the HMD is attached to the observer's head, and a section B (yz section or a first section) is a section of the observation optical system 100R viewed from the side. In addition, a section C (xy section) is a section of the observation optical systems 100L and 100R viewed from the back (or an opposite side to the exit pupil).

In the observation optical system 100R for a right eye, 11R denotes a first optical system, and 12R denotes a second optical system. In the observation optical system 100R for a left eye, 11L denotes a first optical system, and 13L denotes a second optical system.

21R denotes a first image forming device configured to form a first original image for the right eye, and 22R denotes a second image forming device configured to form a second original image for the right eye. 21L denotes a third image forming device configured to form a first original image for the left eye. 23L denotes a fourth image forming device configured to form a second original image for the left eye.

Figure 6A:
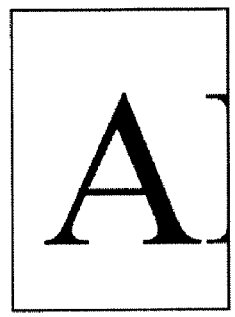
FIG. 6A is a view showing an illustrative second original image for a left eye in the second embodiment.
Figure 6B:
FIG. 6B is a view showing an illustrative first original image for a left eye in the second embodiment.
Figure 6C:
FIG. 6C is a view showing an illustrative first original image for a right eye in the second embodiment.
Figure 6D:
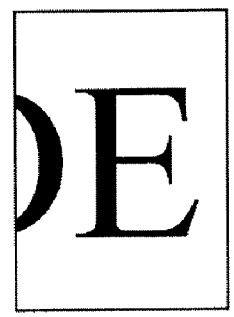
FIG. 6D is a view showing an illustrative second original image for a right eye in the second embodiment.

FIG. 6A shows the second original image for the left eye formed by the fourth image forming device 23L. FIG. 6B shows the first original image for the left eye formed by the third image forming device 21L. FIG. 6C shows the first original image for the right eye formed by the first image forming device 21R. FIG. 6D is the second original image for the right eye formed by the second image forming device 22R.

The first and second optical systems 11R and 12R for the right eye guide the luminous fluxes from the first and second image forming devices 21R and 22R to the common exit pupil SR for the right eye. Thereby, the images corresponding to the first and second original images for the right eye are presented as the images of the different field areas (first and second observation areas θ1R and θ1R) to a right-eye observation field. On the other hand, the first and second optical systems 11L and 13L for the left eye guide the luminous fluxes from the third and fourth image forming devices 21L and 23L to the common exit pupil SL for the left eye. Thereby, the images corresponding to the first and second original images for the left eye are presented as the images of the different field areas (third and fourth observation areas θ1L and θ3L) to a left-eye observation field.

Figure 6E:
FIG. 6E is a view showing a synthesis image of the original images shown in FIGS. 6A to 6D.

The image presented to both eyes is a synthesis image that is made by connecting or synthesizing four images of four different field areas (or angles of field) into one image having a wide angle of view, as shown in FIG. 6E.

In FIG. 5, the section A is a decentering section for the second optical systems 12R and 13L for the right and left eyes. The section B is a decentering section of the first optical systems 11R and 11L for the right and left eyes. In the observation optical system 100R for the right eye, the decentering section A intersects the decentering section B at a right angle on a z axis (visual axis) that is an axis directing from the center (one point) of the exit pupil S to center (one point) of the observation field or the synthesis image. In the observation optical system 100L for the left eye, an axis directing from the center of the exit pupil SL to the center of the synthesis image is an axis parallel to the z axis.

The first optical system 11R for the right eye has a surface S11R (which is a reflective surface as well as an exit transmission surface), a surface S12R (which is a reflective surface), and a surface S13R (which is an incident transmission surface). The second optical system 12R for the right eye has a surface S21R (which is a reflective surface as well as an exit transmission surface), a surface S22R (which is a reflective surface), and a surface S23R (which is an incident transmission surface).

The first and second optical systems 11R and 12R for the right eye (or the observation optical system 100R) are configured by forming the surfaces S11R to S23R on a single optical element 1R filled with a medium having a refractive index greater than 1.

The first optical system 11L for the left eye has a surface S11L (which is a reflective surface as well as an exit transmission surface), a surface S12L (which is a reflective surface), and a surface S13L (which is an incident transmission surface). The second optical system 13L for the left eye has a surface S31L (which is a reflective surface as well as an exit transmission surface), a surface S32L (which is a reflective surface), and a surface S33L (which is an incident transmission surface).

The first and second optical systems 11L and 13L for the left eye (or the observation optical system 100L) are configured by forming the surfaces S11L to S33L on a single optical element 1L filled with a medium having a refractive index greater than 1.

The surfaces S11R, S12R, S21R, S22R, S11L, S12L, S31L, and S32L are decentering reflective surfaces.

The luminous flux from the first original image for the right eye formed by the first image forming device 21R for the right eye is incident upon the optical element 1R via the surface S13R, is reflected on the reflective surface S11R, is reflected on the reflective surface S12R, transmits the surface S11R, and is guided to the exit pupil SR of the right-eye observation optical system 100R. At least one (if possible all) of the surfaces S11R, S12R, and S13R have curved shapes or optical powers. Thereby, the observer who has placed his right eye (pupil) at the position of the exit pupil SR can observe an enlarged virtual image of the first original image for the right eye, in the first field area θ1R.

The luminous flux from the second original image for the right eye formed by the second image forming device 22R for the right eye is incident upon the optical element 1R via the surface S23R, is reflected on the reflective surface S21R, is reflected on the reflective surface S22R, transmits the surface S21R, and is guided to the exit pupil SR of the right-eye observation optical system 100R. Due to the optical powers of at least one (if possible all) of the surfaces S21R, S22R, and S23R, the observer who has placed his right eye (pupil) at the position of the exit pupil SR can observe an enlarged virtual image of the second original image for the right eye, in the second field area θ2R. Thus, the image presented to the right eye is a synthesis image that connects two images of the first and second field areas θ1R and θ2R.

The luminous flux from the first original image for the left eye formed by the third image forming device 21L for the left eye is incident upon the optical element 1L via the surface S13L, is reflected on the reflective surface S11L, is reflected on the reflective surface S12L, transmits the surface S11L, and is guided to the exit pupil SL of the left-eye observation optical system 100L. Due to the optical powers of at least one (if possible all) of the surfaces S11L, S12L, and S13L, the observer who has placed his left eye (pupil) at the position of the exit pupil SL can observe an enlarged virtual image of the first original image for the left eye, in the third field area θ1L.

The luminous flux from the second original image for the left eye formed by the fourth image forming device 23L for the left eye is incident upon the optical element 1L via the surface S33L, is reflected on the reflective surface S31L, is reflected on the reflective surface S32L, transmits the surface S31L, and is guided to the exit pupil SL of the left-eye observation optical system 100L. Due to the optical powers of at least one (if possible all) of the surfaces S31L, S32L, and S33L, the observer who has placed his left eye (pupil) at the position of the exit pupil SL can observe an enlarged virtual image of the second original image for the left eye, in the fourth field area θ3L. Thus, the image presented to the left eye is a synthesis image that connects two images of the third and fourth field areas θ1L and θ3L.

The first original image for the right eye and the first original image for the left eye present images that shift by a parallax of both eyes, to the first field area θ1R and the third field area θ3L. The second original image for the right eye presents to the second field area θ2R an adjacent image on the right side of the image presented by the first original image for the right eye. Moreover, the second original image for the left eye presents to the fourth field area θ3L an adjacent image on the left side of the image presented by the first original image for the left eye. When these four images are synthesized in the observer's brain through sights of both eyes, the observer can three-dimensionally observe an image in the center field corresponding to the first and third field areas θ1R and θ1L, and two-dimensionally observe images in the lateral surrounding fields.

Each of the observation optical systems 100R and 100L for the right eye and the left eye in this embodiment has no optical system having the same decentering section. In addition, the observation optical systems 100R and 100L for the right eye and the left eye are independently configured. Therefore, a luminous flux from one image forming device is less likely to enter another image forming device and a deterioration of the image quality caused by the unnecessary light, such as a flare, is less likely to occur in each of and between the observation optical systems 100R and 100L for the right eye and the left eye.

As shown in the section A in FIG. 5, steps 102R and 102L are formed at the boundaries between the first optical system 11R and the second optical system 12R for the right eye and between the first optical system 11L and the third optical system 13L for the left eye at the back of the optical elements 1R and 1L. A side surface of the step 102R may have a shape that extends to the center of the exit pupil SR of the observation optical system 100R, and a side surface of the step 102L may have a shape that extends to the center of the exit pupil SL of the observation optical system 100L. Thereby, the image can be synthesized without an absence of an image at the seam between the original images and a decrease of the brightness.

A light-shielding film can be formed at the steps 102R and 102L and edge portions 101R and 101L of the first optical systems 11R and 11L so as to restrain a generation of the unnecessary light, such as edge diffusions and stray light.

In this embodiment, each of the observation optical systems 100R and 100L for the right eye and left eye synthesizes two (even number) images through two (even number) optical systems into one image on the decentering section A of the second optical system that is adjacent to the first optical system having the decentering section B. The observation optical systems 100R and 100L for the right eye and the left eye possess shifting visual axes (z axis and an axis parallel to the z axis).

Each of the observation optical systems 100R and 100L for the right eye and the left eye is configured asymmetrically with respect to the visual axis in the horizontal direction in which two image forming devices and two optical systems form the synthesis field. In other words, the first field area at the right eye side and the third field area at the left eye side are configured as field areas with the z axis and the axis parallel to the z axis as centers in the horizontal direction, and the second and fourth field areas are formed outside of them. Moreover, the first and third field areas are wider than the second and fourth field areas in the horizontal direction.

Thereby, when observer addresses the centers of the synthesis images for the right eye and the left eye, the boundary between the field area corresponding to the first original image and the field area corresponding to the second original image is removed from the discrimination visual fields (or the effective visual fields) for the right eye and the left eye.

Therefore, the observation optical system for both eyes can be formed in which a degradation of the image quality is less likely to be recognized, which is caused by a discontinuity of the images, and a decrease of the brightness or the unnecessary light which is generated at a seam between the images that constitute the synthesis image.

The observation optical systems 100R and 100L in this embodiment fold the optical paths of the luminous fluxes from the two original images in the decentering section by using the two decentering optical systems (11R, 12R and 11L, 13L). The two images corresponding to the two original images are synthesized, and one synthesis image can be observed for the left and right eyes. Therefore, an angle of view to be presented by the whole observation optical system is sufficiently wide for the thickness of each optical system.

In addition, according to this embodiment, the center of the right-eye observation optical system 100R (center of the right-eye synthesis image) and the center of the left-eye observation optical system 100L (center of the left-eye synthesis image) are different from each other, and the observation field which both observation optical systems 100R and 100L form has the field areas that do not overlap each other. Thereby, a structure can be implemented which is not subject to a restriction of an optical arrangement due to the observer's eye interval.

Third Embodiment

Figure 7:
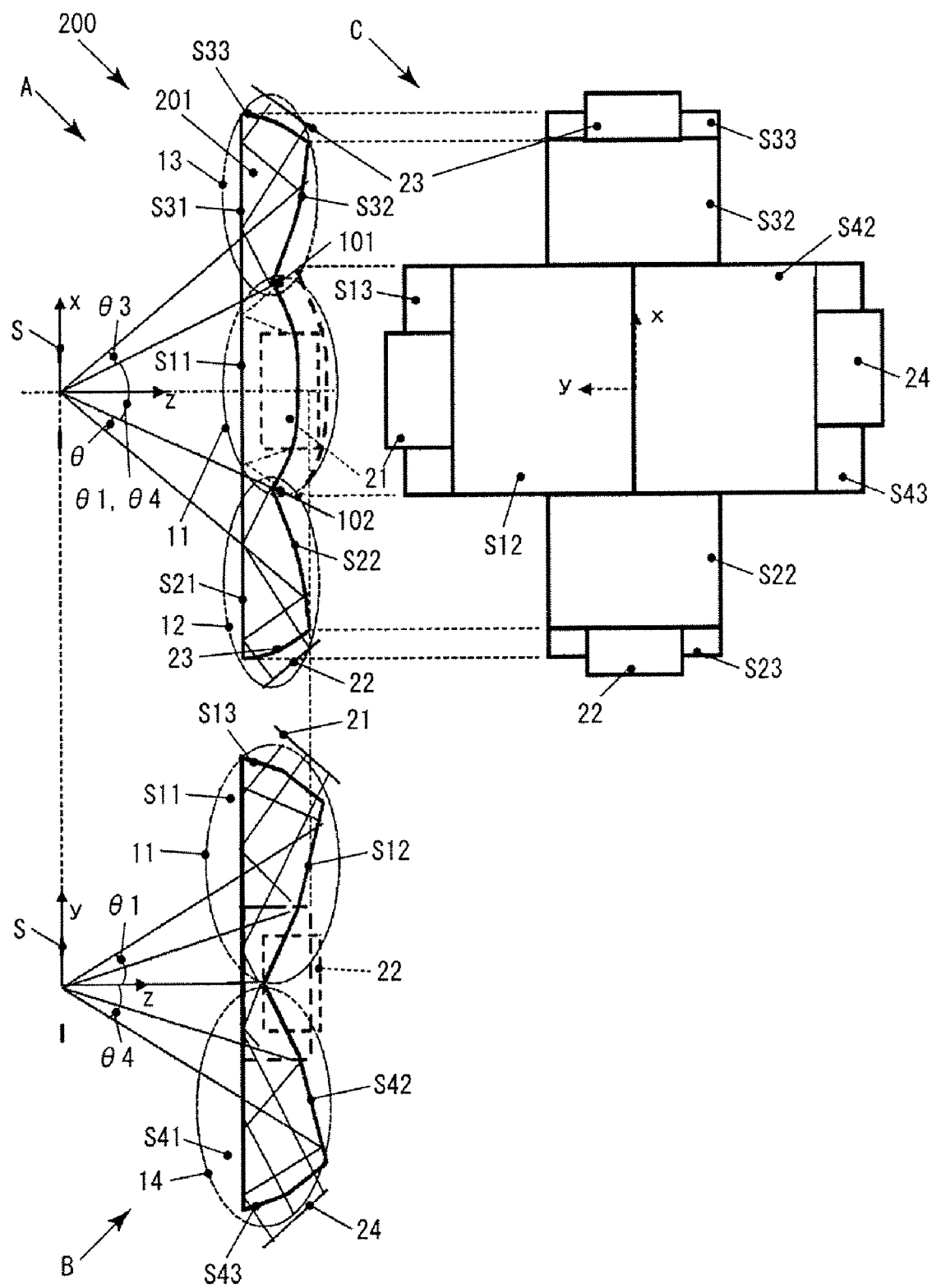
FIG. 7 is a top sectional view, a side sectional view, and a rear view of an observation optical system in a HMD according to a third embodiment of the present invention.

FIG. 7 shows a structure of the observation optical system 200 in an HMD according to a third embodiment of the present invention.

When the HMD is attached to the observer's head, the observer who has placed his single eye (pupil) at the exit pupil of the observation optical system 200 can observe an image well.

A section A (xz section or a second section) in FIG. 7 is a section of the observation optical system 200 viewed from the top after the HMD is attached to the observer's head, and a section B (yz section or a first section) is a section of the observation optical system 200 viewed from the side. In addition, a section C (xy section) is a section of the observation optical system 200 viewed from the back (or an opposite side to the exit pupil). Although FIG. 7 shows the observation optical system 200 for a single eye, the actual HMD is provided with a pair of observation optical systems 200 for the right eye and for the left eye.

11 denotes a first optical system, 12 denotes a second optical system, 13 denotes a third optical system, and 14 denotes a fourth optical system. 21 denotes a first image forming device that displays a first original image, 22 denotes a second image forming device that displays a second original image, 23 denotes a third image forming device that displays a third original image, and 24 denotes a fourth image forming device that displays a fourth original image.

Figure 8A:
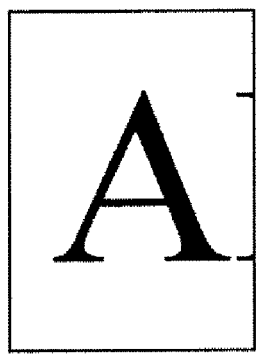
FIG. 8A is a view showing an illustrative third original image in the third embodiment.
Figure 8B:
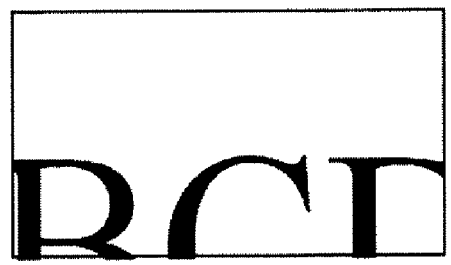
FIG. 8B is a view showing an illustrative first original image in the third embodiment.
Figure 8C:
FIG. 8C is a view showing an illustrative fourth original image in the third embodiment.
Figure 8D:
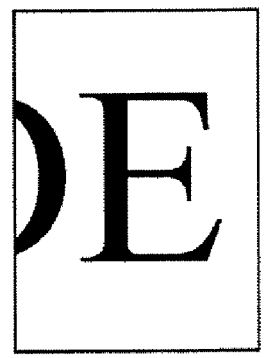
FIG. 8D is a view showing an illustrative second original image in the third embodiment.

FIG. 8A shows the third original image formed by the third image forming device 23. FIG. 8B shows the first original image formed by the first image forming device 21. FIG. 8C is the fourth original image formed by the fourth image forming device 24. FIG. 8D is the second original image formed by the second image forming device 22.

Figure 8E:
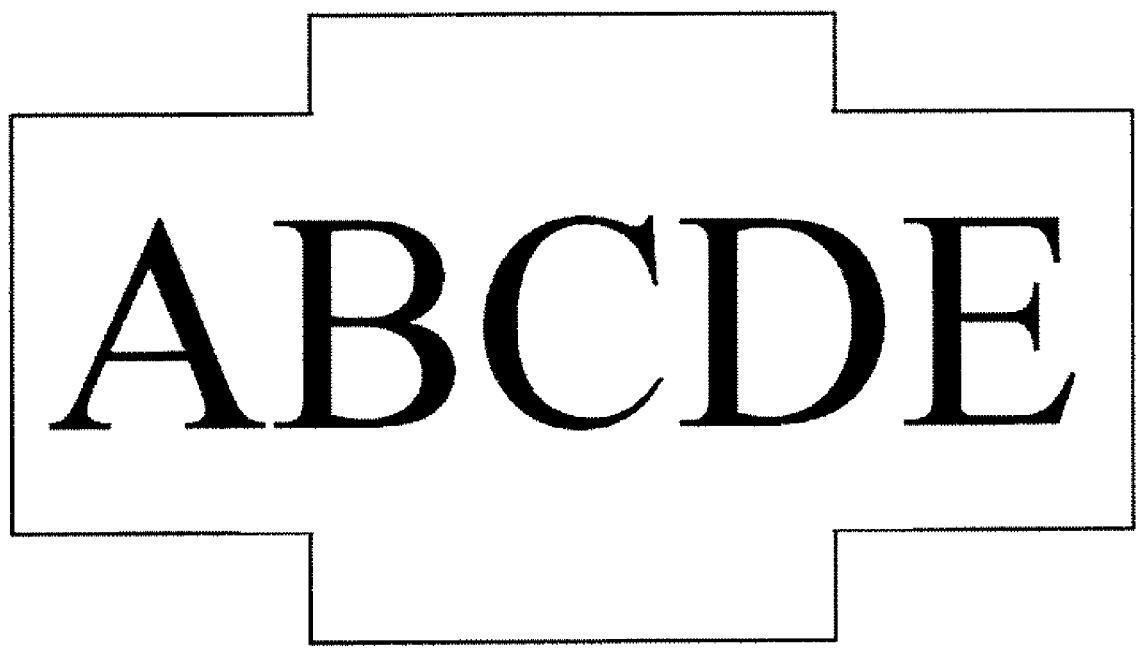
FIG. 8E is a view showing an illustrative synthesis image of the original images shown in FIGS. 8A to 8D.

The first to fourth optical systems 11 to 14 guide the luminous fluxes from the first to fourth image forming devices 21 to 24 to the common exit pupil S, and present to the observation field images of different field areas (first to fourth field areas θ1 to θ4), which correspond to the first to fourth original images. Thereby, the presented image is a synthesis image which is made by connecting or synthesizing four images of four different field areas (or angles of field) into one image having a wide angle of view as a whole, as shown in FIG. 8E.

In FIG. 7, the section A is a decentering section of the second and third optical systems 12 and 13. The section B is a decentering section of the first and fourth optical systems 11 and 14. S denotes an exit pupil of the observation optical system 200. The decentering section A intersects the decentering section B at a right angle on the z axis that is an axis directing from the center (one point) of the exit pupil S to the center (one point) of the observation field or the synthesis image. The x-axis direction denotes a horizontal direction of the observation field, and the y-axis direction denotes the perpendicular direction of the observation field.

The first optical system 11 has a surface S11 (which is a reflective surface as well as an exit transmission surface), a surface S12 (which is a reflective surface), and a surface S13 (which is an incident transmission surface). The second optical system 12 has a surface S21 (which is a reflective surface as well as an exit transmission surface), a surface S22 (which is a reflective surface), and a surface S23 (which is an incident transmission surface). The third optical system 13 has a surface S31 (which is a reflective surface as well as an exit transmission surface), a surface S32 (which is a reflective surface), and a surface S33 (which is an incident transmission surface). The fourth optical system 14 has a surface S41 (which is a reflective surface as well as an exit transmission surface), a surface S42 (which is a reflective surface), and a surface S43 (which is an incident transmission surface).

The first to fourth optical systems 11 to 14 (or the observation optical system 200) are configured by forming the surfaces S11 to S43 on a single optical element 201 filled with a medium having a refractive index greater than 1.

The surfaces S11, S12, S21, S22, S31, S32, S41, and S42 are decentering reflective surfaces.

The luminous flux from the first original image formed by the first image forming device 21 is incident upon the optical element 201 via the surface S13 of the first optical system 11, is reflected on the reflective surface S11, is reflected on the reflective surface S12, transmits the surface S11, and is guided to the exit pupil S. When at least one (if possibly all) of the surfaces S11 to S13 have curved shapes or optical powers, the observer who has placed his eye (pupil) at the position of the exit pupil S can observe an enlarged virtual image of the first original image, in the first field area $\theta 1$.

The luminous flux from the second original image formed by the second image forming device 22 is incident upon the optical element 201 via the surface S23 of the second optical system 12, is reflected on the reflective surface S21, is reflected on the reflective surface S22, transmits the surface S21, and is guided to the exit pupil S. Due to the optical powers of at least one (if possibly all) of the surfaces S21 to S23, the observer who has placed his eye (pupil) at the position of the exit pupil S can observe an enlarged virtual image of the second original image, in the second field area $\theta 2$.

The luminous flux from the third original image formed by the third image forming device 23 is incident upon the optical element 201 via the surface S33 of the third optical system 13, is reflected on the reflective surface S31, is reflected on the reflective surface S32, transmits the surface S31, and is guided to the exit pupil S. Due to the optical powers of at least one (if possibly all) of the surfaces S31 to S33, the observer who has placed his eye (pupil) at the position of the exit pupil S can observe an enlarged virtual image of the third original image, in the third field area $\theta 3$.

The luminous flux from the fourth original image formed by the fourth image forming device 24 is incident upon the optical element 201 via the surface S43 of the fourth optical system 14, is reflected on the reflective surface S41, is reflected on the reflective surface S42, transmits the surface S41, and is guided to the exit pupil S. Due to the optical powers of at least one (if possibly all) of the surfaces S41 to S43, the observer who has placed his eye (pupil) at the position of the exit pupil S can observe an enlarged virtual image of the fourth original image, in the fourth field area $\theta 4$.

Thus, when the luminous fluxes from the four original images are guided to the exit pupil S through the corresponding optical systems, the observer can observe a synthesis image that is made by synthesizing the enlarged virtual images of the original images into one image, in the observation field that includes the first to fourth field areas $\theta 1$ to $\theta 4$. A synthesis field of the first and fourth field areas $\theta 1$ and $\theta 4$ is a field area that extends in the horizontal direction with the z axis as a center, and wider than each of the second and third field areas $\theta 2$ and $\theta 3$.

The observation optical system 200 of this embodiment has two pairs of optical systems each having the same decentering section. The first and fourth optical systems 11 and 14 have the same decentering section B, and are adjacently arranged in the perpendicular direction; the luminous flux from one image forming device is incident upon and reflected on the other image forming device, and guided to the exit pupil S, possibly causing the unnecessary light. On the other hand, the second and third optical systems 12 and 13 having the decentering section A are arranged opposite to each other with respect to the first and fourth optical systems 11 and 14. Therefore, the unnecessary light is less likely to occur, because the luminous flux from one image forming device is less likely to be incident upon and reflected on the other image forming device, guided to the exit pupil S. Therefore, a degradation of the image quality, such as a flare, is less likely to occur.

As shown in the section A in FIG. 7, steps 101 and 102 are formed at the boundaries between the first and fourth optical systems 11 and 14 and the second and third optical system 12 and 13 on the back side of the optical element 201. Each of side surfaces of the steps 101 and 102 may have shapes that extend to the center of the exit pupil S of the observation optical system 200. Thereby, an image can be synthesized without an absence of an image and a decrease of the brightness at a seam between the original images.

A light-shielding film can be formed at the steps 101 and 102 so as to restrain a generation of the unnecessary light, such as edge diffusions and stray light.

The observation optical system 200 of this embodiment is provided with the two optical systems 11 and 14 in the direction of the section B shown in FIG. 7. The center of the synthesis image formed by these two optical systems 11 and 14 can shift from the z axis as a visual axis by several degrees. Thereby, the boundary between the first field area corresponding to the first original image and the fourth field area corresponding to the fourth original image is included in the observer's effective visual field but removed from the discrimination visual field. Therefore, an observation optical system can be formed in which a degradation of the image quality, which is caused by the discontinuity of the images, a decrease of the brightness, and the unnecessary light at a seam between images that constitute the synthesis image, is less likely to be recognized near the center of the synthesis image which is required for the highest resolving power in the usual observation state. In addition, this structure can make uniform a shortage amount of the longitudinal field to the guide visual field, and enhance the realism The observation optical system 200 of this embodiment folds the optical paths of the luminous fluxes from the four original images, in the decentering section by using the four decentering optical systems 11 to 14, and enables the four images corresponding to the four original images to be synthesized and one synthesis image to be observed. Therefore, an angle of field which the whole observation optical system 200 can present is sufficiently wide relative to the thickness of each optical system.

Fourth Embodiment

Figure 9:
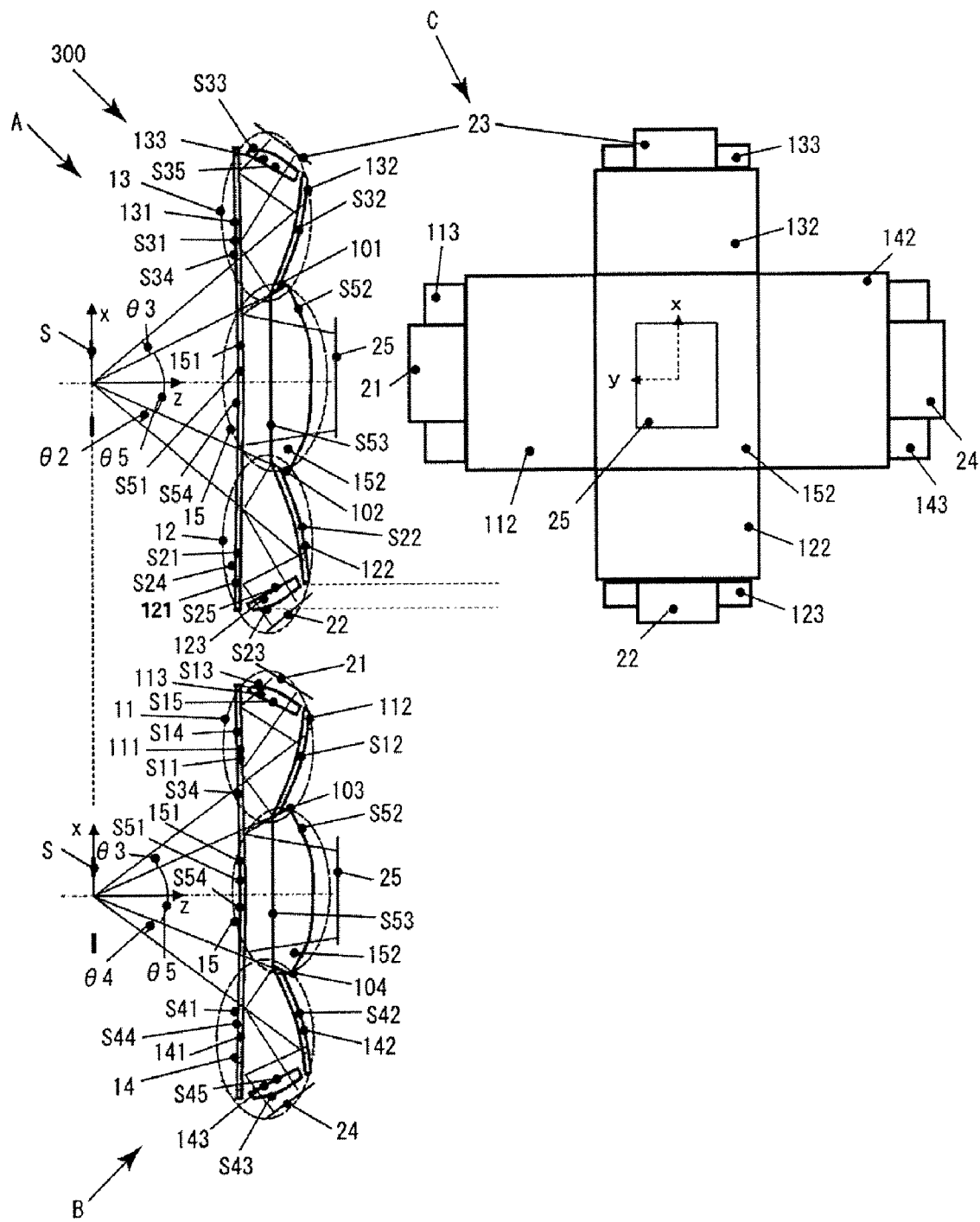
FIG. 9 is a top sectional view, a side sectional view, and a rear view of an observation optical system in a HMD according to a fourth embodiment of the present invention.

FIG. 9 shows a structure of an observation optical system 300 in an HMD according to a fourth embodiment of the present invention.

When the HMD is attached to the observer's head, the observer who has placed his single eye (pupil) at the exit pupil of the observation optical system 300 can observe an image well.

A section A (xz section or a second section) in FIG. 9 is a section of the observation optical system 300 viewed from the top after the HMD is attached to the observer's head, and a section B (yz section or a first section) is a section of the observation optical system 300 viewed from the side. In addition, a section C (xy section) is a section of the observation optical system 300 viewed from the back (or an opposite side to the exit pupil). Although FIG. 9 shows the observation optical system 300 for a single eye, the actual HMD is provided with a pair of observation optical systems 300 for each of the right and left eyes.

11 denotes a first optical system, 12 denotes a second optical system, 13 denotes a third optical system, 14 denotes a fourth optical system, and 15 denotes a fifth optical system. 21 denotes a first image forming device that displays a first original image, 22 denotes a second image forming device that displays a second original image, 23 denotes a third image forming device that displays a third original image, 24 denotes a fourth image forming device that displays a fourth original image, and 25 denotes a fifth image forming device that displays a fifth original image.

Figure 10A:
FIG. 10A is a view showing an illustrative third original image in the fourth embodiment.
Figure 10B:
FIG. 10B is a view showing an illustrative first original image in the fourth embodiment.
Figure 10C:
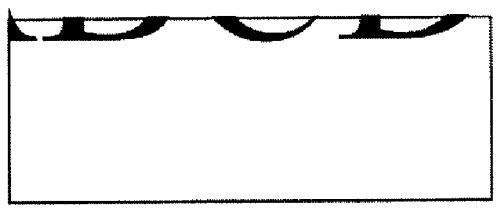
FIG. 10C is a view showing an illustrative fourth original image in the fourth embodiment.
Figure 10D:
FIG. 10D is a view showing an illustrative second original image in the fourth embodiment.
Figure 10E:
FIG. 10E is a view showing an illustrative fifth original image in the fifth embodiment.

FIG. 10A shows the third original image formed by the third image forming device 23. FIG. 10B shows the first original image formed by the first image forming device 21. FIG. 10C is the fourth original image formed by the fourth image forming device 24. FIG. 10D is the second original image formed by the second image forming device 22. FIG. 10E is the fifth original image formed by the fifth image forming device 25.

Figure 10F:
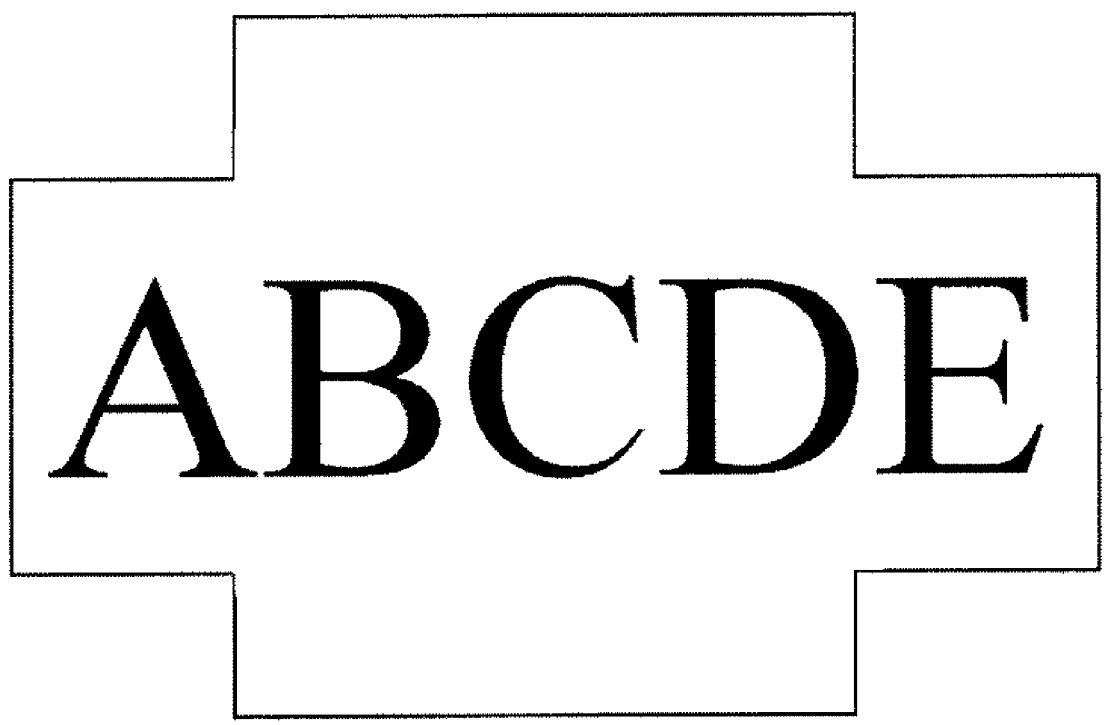
FIG. 10F is a view showing a synthesis image of the original images shown in FIGS. 10A to 10E.

The first to fifth optical systems 11 to 15 guide the luminous fluxes from the first to fifth image forming devices 21 to 25 to the common exit pupil S, and present to the observation field images of different field areas (first to fifth field areas θ1 to θ5), which correspond to the first to fifth original images. Thereby, the presented image is a synthesis image which connects or synthesizes five images of five different field areas (or angles of field) into one image having a wide angle of view as a whole, as shown in FIG. 10F.

The observation optical system 300 includes the first to fourth optical systems 11 to 14 each having a hollow structure arranged on the top, bottom, left, and right sides of the fifth optical system 15 that includes an optical element 152 filled with a medium having a refractive index greater than 1.

In FIG. 9, the section A is a decentering section of the second and third optical systems 12 and 13. The section B is a decentering section of the first and fourth optical systems 11 and 14. The fifth optical system 15 has a rotationally symmetrical shape and no decentering section. S denotes an exit pupil of the observation optical system 300. The decentering section A intersects the decentering section B at a right angle on a z axis that is an axis directing from the center (one point) of the exit pupil S to the center (one point) of the observation field or the synthesis image. The x-axis direction denotes a horizontal direction of the observation field, and the y-axis direction denotes the perpendicular direction of the observation field.

The first optical system 11 has an element 111 that has a surface S11 (which is a reflective surface as well as a transmission surface) and a surface (transmission surface) S14, an element 112 that has a surface S12 (which is a reflective surface), and an element 113 that has a surface S13 (which is an incident transmission surface) and a surface (transmission surface) S15.

The second optical system 12 has an element 121 that has a surface S21 (which is a reflective surface as well as a transmission surface) and a surface (transmission surface) S24, an element 122 that has a surface S22 (which is a reflective surface), and an element 123 that has a surface S23 (which is an incident transmission surface) and a surface (transmission surface) S25.

The third optical system 13 has an element 131 that has a surface S31 (which is a reflective surface as well as a transmission surface) and a surface (transmission surface) S34, an element that has a surface S32 (which is a reflective surface), and an element 133 that has a surface S33 (which is an incident transmission surface) and a surface (transmission surface) S35.

The fourth optical system 14 has an element 141 that has a surface S41 (which is a reflective surface as well as a transmission surface) and a surface (transmission surface) S44, an element 142 that has a surface S42 (which is a reflective surface), and an element 143 that has a surface S43 (which is an incident transmission surface) and a surface (transmission surface) S45.

The fifth optical system 15 has an element 151 that has a surface (transmission surface) S51 and a surface (exit transmission surface) S54, and an element 152 that has a surface (incident transmission surface) S52 and a surface (transmission surface) S53.

The surfaces S11, S12, S21, S22, S31, S32, S41, and S42 are decentering reflective surfaces.

The luminous flux from the first original image formed by the first image forming device 21 passes the surfaces S13 and S15, undergoes a lens operation of the element 113, is reflected on the reflective surface S11 on which a semipermeable reflection membrane is formed, and directs to the element 112. A reflection film is formed on the surface S12 of the element 112. The luminous flux reflected on the reflective surface S12 transmits the element 111 having the surfaces S11 and S14, and is guided to the exit pupil S of the observation optical system 300. When at least one (if possibly all) of these surfaces have curved shapes or optical powers, the observer who has placed his eye (pupil) at the position of the exit pupil S can observe an enlarged virtual image of the first original image, in the first field area θ1.

The luminous flux from the second original image formed by the second image forming device 22 passes the surfaces S23 and S25, undergoes a lens operation of the element 123, is reflected on the reflective surface S21 on which a semipermeable reflection membrane is formed, and directs to the element 122. A reflection film is formed on the surface S22 of the element 122. The luminous flux reflected on the reflective surface S22 transmits the element 121 having the surfaces S21 and S24, and is guided to the exit pupil S of the observation optical system 300. Due to the optical powers of at least one (if possibly all) of these surfaces, the observer who has placed his eye (pupil) at the position of the exit pupil S can observe an enlarged virtual image of the second original image, in the second field area θ2.

The luminous flux from the third original image formed by the third image forming device 23 passes the surfaces S33 and S35, undergoes a lens operation of the element 133, is reflected on the reflective surface S31 on which a semipermeable reflection membrane is formed, and directs to the element 132. A reflection film is formed on the surface S32 of the element 132. The luminous flux reflected on the reflective surface S32 transmits the element 131 having the surfaces S31 and S34, and is guided to the exit pupil S of the observation optical system 300. Due to the optical powers of at least one (if possibly all) of these surfaces, the observer who has placed his eye (pupil) at the position of the exit pupil S can observe an enlarged virtual image of the third original image, in the third field area θ3.

The luminous flux from the fourth original image formed by the fourth image forming device 24 passes the surfaces S43 and S45, undergoes a lens operation of the element 143, is reflected on the reflective surface S41 on which a semipermeable reflection membrane is formed, and directs to the element 142. A reflection film is formed on the surface S42 of the element 142. The luminous flux reflected on the reflective surface S42 transmits the element 141 having the surfaces S41 and S44, and is guided to the exit pupil S of the observation optical system 300. Due to the optical powers of at least one (if possibly all) of these surfaces, the observer who has placed his eye (pupil) at the position of the exit pupil S can observe an enlarged virtual image of the fourth original image, in the fourth field area θ4.

The luminous flux from the fifth original image formed by the fifth image forming device 25 passes the surfaces S52 and S53, and is reflected on the half-mirror reflective surface S51. Moreover, the reflected luminous flux passes the surface S53, is reflected on the half-mirror reflective surface S52, passes the surfaces S53, S51, and S54, and is guided to the exit pupil S of the observation optical system 300. Due to the refractive indexes of at least one (if possibly all) of these surfaces, the observer who has placed his eye (pupil) at the position of the exit pupil S can observe an enlarged virtual image of the fifth original image, in the fifth field area θ5.

When the luminous fluxes from the five original images are guided to the exit pupil S through the corresponding optical systems, the observer can observe a synthesis image that synthesizes these enlarged virtual images into one image in the observation field that includes the first to fifth field areas θ1 to θ5. A synthesis field of the first, fourth, and fifth field areas θ1, θ4, and θ5 is a field area that extends in the horizontal direction with the z axis as a center, and wider than each of the second and third field areas θ2 and θ3.

The observation optical system 300 of this embodiment has two pairs of optical systems each having the same decentering section. The first and fourth optical systems 11 and 14 have the same decentering section B, and are arranged opposite to each other in the perpendicular direction with respect to the fifth optical system 15. In addition, the second and third optical systems 12 and 13 have the same decentering section A, and are arranged opposite to each other in the horizontal direction with respect to the fifth optical system 15. Therefore, between the first and fourth optical systems 11 and 14 and between the second and third optical systems 12 and 13, the unnecessary light is less likely to occur because the luminous flux from one image forming device is less likely to be incident upon and reflected on the other image forming device, and guided to the exit pupil S. Therefore, a degradation of the image quality, such as a flare, is less likely to occur.

As shown in the sections A and B in FIG. 9, steps 101 to 104 are formed at the boundaries between the fifth optical system 15 (element 152) and the first to fourth optical systems 11 to 14 on the back side of the observation optical system 300. The surfaces of the steps 101 to 104 (the surfaces on the top, bottom, left and right sides of the element 152) may have shapes that extend to the center of the exit pupil S of the observation optical system 300. Thereby, an image can be synthesized without an absence of the image and a decrease of the brightness at a seam between the original images.

A light-shielding film can be formed at the steps 101 to 104 so as to restrain a generation of the unnecessary light, such as edge diffusions and stray light.

The observation optical system 300 of this embodiment is provided with the three optical systems 11, 14, and 15 in the direction of the section B shown in FIG. 9. The center of the synthesis image formed by these three optical systems 11, 14, and 15 can accord with the z axis that is a visual axis. Thereby, the boundaries between the fifth field area corresponding to the fifth original image and the first field area corresponding to the first original image and between the fifth field area and the fourth field areas corresponding to the fourth original image are removed from the observer's discrimination visual field. Therefore, an observation optical system can be formed in which a deterioration of the image quality, which is caused by the discontinuity of the image, a decrease of the brightness, and the unnecessary light at a seam between images that constitute the synthesis image, is less likely to be recognized near the center of the synthesis image that is required for the highest resolving power in the usual observation state. In addition, the fifth field area formed by the fifth optical system may exceed the observer's effective visual field.

The observation optical system 300 of this embodiment folds in the decentering section the optical paths of the luminous fluxes from the four original images in the decentering section by using the four decentering optical systems 11 to 14. In addition, the observation optical system 300 of this embodiment enables the four images corresponding to the four original images and one image corresponding to one original image via the coaxial optical system 15 to be synthesized and one synthesis image to be observed. Therefore, an angle of view which the observation optical system can present as a whole is sufficiently wide relative to the thickness of each optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, while the first to fourth embodiments describe that the observation optical system has two decentering sections that intersect each other at a right angle, an angle at which the decentering sections intersect each other does not have to a right angle. However, the orthogonal intersection is useful because it facilitates not only a production of the observation optical system, but also a dividing process of image data input from the image supply apparatus 501 into a plurality of original images corresponding to a plurality of field areas.

This application claims the benefit of Japanese Patent Application No. 2007-322713, filed on Dec. 14, 2007, which is hereby incorporated by reference herein in its entirety.

What is claimed is:

1. An image display apparatus comprising:
a plurality of image forming devices, each of which is configured to form an original image; and
an observation optical system configured to guide luminous fluxes from the plurality of image forming devices to a common exit pupil, and to present images that correspond to the plurality of original images and serve as images of different field areas in an observation field, wherein the observation optical system includes at least a first optical system configured to fold in a direction of a first section a luminous flux from a first image forming device by using a plurality of reflective surfaces in the first optical system and to guide the luminous flux from the first image forming device to the exit pupil, and a second optical system configured to fold in a direction of a second section a luminous flux from a second image forming device by using a plurality of reflective surfaces in the second optical system and to guide the luminous flux from the second image forming device to the exit pupil, wherein the first section is a section in which the plurality of reflective surfaces in the first optical system reflect a ray that passes a center of the first image forming device and a center of the exit pupil, and the second section is a section in which the plurality of reflective surfaces in the second optical system reflect a ray that passes a center of the second image forming device and the center of the exit pupil, and wherein the first section intersects the second section at a right angle on an axis that directs from one point in the exit pupil to one point in the observation field.

2. An image display apparatus according to claim 1, wherein the first optical system and the second optical system are different in at least one of shape, size, and focal length.

3. An image display apparatus according to claim 1, wherein the first image forming device and the second image forming device are different in at least one of shape and size of an area configured to form the original image.

4. An image display apparatus according to claim 1, wherein the observation optical system includes a third optical system configured to fold in the direction of the second section a luminous flux from a third image forming device by using a plurality of reflective surfaces in the third optical system, and to guide the luminous flux from the third image forming device to the exit pupil, and wherein the second and third optical system are arranged opposite to each other with respect to the first optical system.

5. An image display apparatus according to claim 1, wherein the image display apparatus includes a pair of observation optical systems for a right eye and a left eye, and wherein an observation field formed by the observation optical system for the right eye and an observation field formed by the observation optical system for the left eye have field areas that do not overlap each other.

6. An image display apparatus according to claim 1, wherein the observation optical system is configured by forming the plurality of reflective surfaces in the first optical system and the plurality of reflective surfaces in the second optical system on a single optical element having an index of refraction grater than 1.

7. An image display apparatus according to claim 6, wherein the single optical element is an integrally molded optical element that constitutes the first and second optical systems, or a bonded and integrated optical element formed of a first optical element that constitutes the first optical system and a second optical element that constitutes the second optical system.

8. An image display apparatus according to claim 1, wherein the different field areas in the observation field include a first field area and a second field area larger than the first field area.

9. An image display apparatus according to claim 1, wherein the images of different field areas in the observation field include a first image and a second image larger than the first image, and wherein the first image and the second image are synthesized to form a magnified virtual image observable at the exit pupil.

10. An image display apparatus comprising:

a plurality of image forming devices, each of which is configured to form an original image; and an observation optical system configured to guide luminous fluxes from the plurality of image forming devices to a common exit pupil, and to present images that correspond to the plurality of original images and serve as images of different field areas in an observation field, wherein the observation optical system includes at least a first optical system configured to fold in a direction of a first section a luminous flux from a first image forming device by using a plurality of reflective surfaces in the first optical system and to guide the luminous flux from the first image forming device to the exit pupil, and a second optical system configured to fold in a direction of a second section a luminous flux from a second image forming device by using a plurality of reflective surfaces in the second optical system and to guide the luminous flux from the second image forming device to the exit pupil, wherein the first section is a section in which the plurality of reflective surfaces in the first optical system reflect a ray that passes a center of the first image forming device and a center of the exit pupil, and the second section is a section in which the plurality of reflective surfaces in the second optical system reflect a ray that passes a center of the second image forming device and the center of the exit pupil, wherein the first section intersects the second section on an axis that directs from one point in the exit pupil to one point in the observation field, and wherein the plurality of reflective surfaces in the first optical system and the plurality of reflective surfaces in the second optical system are part of a single optical element.

* * * * *